United States Patent
Feins et al.

(10) Patent No.: US 12,512,018 B2
(45) Date of Patent: Dec. 30, 2025

(54) SURGICAL TRAINING DEVICE FOR USE WITH THORACIC TISSUE MODEL AND ASSOCIATED METHODS

(71) Applicant: INTUITIVE SURGICAL OPERATIONS, INC., Sunnyvale, CA (US)

(72) Inventors: Richard H. Feins, Chapel Hill, NC (US); John C. Alexander, Jr., Pinehurst, NC (US); Jay Rohde, Chapel Hill, NC (US); Daniel S. Oh, Yorba Linda, CA (US)

(73) Assignee: INTUITIVE SURGICAL OPERATIONS, INC., Sunnyvale, CA (US)

( * ) Notice: Subject to any disclaimer, the term of this patent is extended or adjusted under 35 U.S.C. 154(b) by 455 days.

(21) Appl. No.: 18/297,667

(22) Filed: Apr. 10, 2023

(65) Prior Publication Data
US 2023/0335013 A1 Oct. 19, 2023

Related U.S. Application Data

(60) Provisional application No. 63/362,899, filed on Apr. 13, 2022.

(51) Int. Cl.
*G09B 23/30* (2006.01)
(52) U.S. Cl.
CPC ......... *G09B 23/303* (2013.01); *G09B 23/306* (2013.01)

(58) Field of Classification Search
CPC .... G09B 23/30; G09B 23/303; G09B 23/306; G09B 23/32; G09B 23/34; G09B 23/28; G09B 23/281–288
See application file for complete search history.

(56) References Cited

U.S. PATENT DOCUMENTS

| | | | | |
|---|---|---|---|---|
| 8,852,208 | B2* | 10/2014 | Gomez | B32B 3/12 606/1 |
| 9,295,524 | B2* | 3/2016 | Schena | A61B 34/30 |
| 9,358,074 | B2* | 6/2016 | Schena | A61B 90/50 |
| 10,410,542 | B1* | 9/2019 | Stone | G06V 10/764 |
| 2014/0329217 | A1* | 11/2014 | Barsness | G09B 23/285 434/272 |
| 2016/0055767 | A1* | 2/2016 | Tessier | G09B 23/288 434/267 |

(Continued)

OTHER PUBLICATIONS

Vertut, J, and Coiffet, P., "Robot Technology: Teleoperation and Robotics Evolution and Development," English translation, Prentice-Hall, Inc., Inglewood Cliffs, NJ, USA 1986, vol. 3A, 332 pages.

*Primary Examiner* — Omkar A Deodhar
(74) *Attorney, Agent, or Firm* — ALLEN, DYER, DOPPELT, GILCHRIST, P.A.

(57) ABSTRACT

A surgical training device for use with a thoracic tissue model includes a base having a thoracic tissue model receiving area. A first rib mounting member is slidably coupled to the base adjacent a first side of the thoracic tissue model receiving area and a second rib mounting member is slidably coupled to the base adjacent a second side of the thoracic tissue model receiving area opposite the first side. A plurality of simulated ribs each have a first end coupled to the first rib mounting member and a second end coupled to the second rib mounting member, and are repositionable between right and left thoracic configurations.

25 Claims, 11 Drawing Sheets

(56) References Cited

U.S. PATENT DOCUMENTS

2017/0076636 A1* 3/2017 Moore ................. G09B 23/285
2020/0372832 A1* 11/2020 Salvino ................ G09B 23/285
2022/0343798 A1* 10/2022 Takeuchi ............. G09B 23/285

* cited by examiner

SURGICAL TRAINING DEVICE FOR USE WITH THORACIC TISSUE MODEL AND ASSOCIATED METHODS

PRIORITY APPLICATION(S)

This application is based upon U.S. provisional patent application Ser. No. 63/362,899 filed Apr. 13, 2022, the disclosure which is hereby incorporated by reference in its entirety.

FIELD OF THE INVENTION

The present invention is directed to surgical training, and more particularly, to a surgical training device for use with a thoracic tissue model and simulated ribs and related methods.

BACKGROUND OF THE INVENTION

Surgical procedures may be performed using open or general surgery, laparoscopic surgery, and/or robotically assisted surgery. To become qualified to perform surgical procedures, surgeons participate in comprehensive training to become proficient in the variety of tasks required to perform the procedures. Such tasks include inserting and directing surgical tools to anatomical features of interest such as tissue or organs, manipulating tissue, grasping, clamping, cutting, sealing, suturing, and stapling tissue, as well as other tasks. To gain proficiency, it is beneficial to allow surgeons to repeatedly practice these tasks for multiple different procedures. In addition, it can be beneficial to quantify training and performance of such tasks by surgeons, thereby enabling them to track progress and improve performance.

Various surgical training systems have been developed to provide surgical training. For example, training may be conducted on human cadavers. However, cadavers may be expensive and provide limited opportunities to train. In addition, a single cadaver may not allow the surgeon to repeatedly practice the same procedure. Surgical tissue models have also been utilized for surgical training. However, these tissue models may not be suitable for training minimally invasive procedures using laparoscopic or robotically assisted tools. In minimally invasive procedures, the surgical tools must be inserted into the body via natural orifices or small surgical incisions and then positioned near the anatomical features of interest.

Conventional surgical tissue models designed for thoracic and chest wall surgical training have limitations because the anatomy of the rib cage is different between the left side and the right side. Currently, two separate side specific models are required for training surgeons on respective left sided and right sided thoracic procedures. As a result, not only is it time consuming during training to switch over from one model to the other model, but the individual costs for thoracic surgical training increase because two different models must be kept on site for surgical training, i.e., one model for the left side and one model for the right side.

SUMMARY OF THE INVENTION

This summary is provided to introduce a selection of concepts that are further described below in the Detailed Description. This summary is not intended to identify key or essential features of the claimed subject matter, nor is it intended to be used as an aid in limiting the scope of the claimed subject matter.

In general, a surgical training device for use with a thoracic tissue model may comprise a base having a thoracic tissue model receiving area thereon, a first rib mounting member slidably coupled to the base adjacent a first side of the thoracic tissue model receiving area, and a second rib mounting member slidably coupled to the base adjacent a second side of the thoracic tissue model receiving area opposite the first side. A plurality of simulated ribs may each have a first end coupled to the first rib mounting member and a second end coupled to the second rib mounting member, wherein the plurality of simulated ribs are repositionable between right and left thoracic configurations.

Each of the first ends of the simulated ribs may be rotatably coupled to the first rib mounting member. Each of the second ends of the simulated ribs may be rotatably coupled to the second mounting member. A simulated spinal member may be movable between the first and second sides of the thoracic tissue model receiving area, and in an example, the simulated spinal member may be slidably mounted on the plurality of simulated ribs. A simulated skin layer may be over the plurality of simulated ribs.

The base may have a tray receiving opening therein configured to removably receive a tray carrying the thoracic tissue model. The base may comprise a body, and a removable access panel coupled thereto. A fluid pump may be configured to be coupled to the thoracic tissue model. In an example, the thoracic tissue model may comprise harvested porcine tissue, and each simulated rib may comprise a flexible polymer material.

Another aspect is directed to a method of preparing a surgical training device that may comprise positioning a thoracic tissue model on a base having a thoracic tissue model receiving area thereon. The method may include slidably positioning at least one of a first rib mounting member coupled to the base adjacent a first side of the thoracic tissue model receiving area and a second rib mounting member coupled to the base adjacent a second side of the thoracic tissue model receiving area opposite the first side, wherein a plurality of simulated ribs coupled to the first and second rib mounting members are positioned in a right or left thoracic configuration.

BRIEF DESCRIPTION OF THE DRAWINGS

Other objects, features and advantages of the present invention will become apparent from the Detailed Description of the invention which follows, when considered in light of the accompanying drawings in which.

DETAILED DESCRIPTION

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art.

Figure 1:
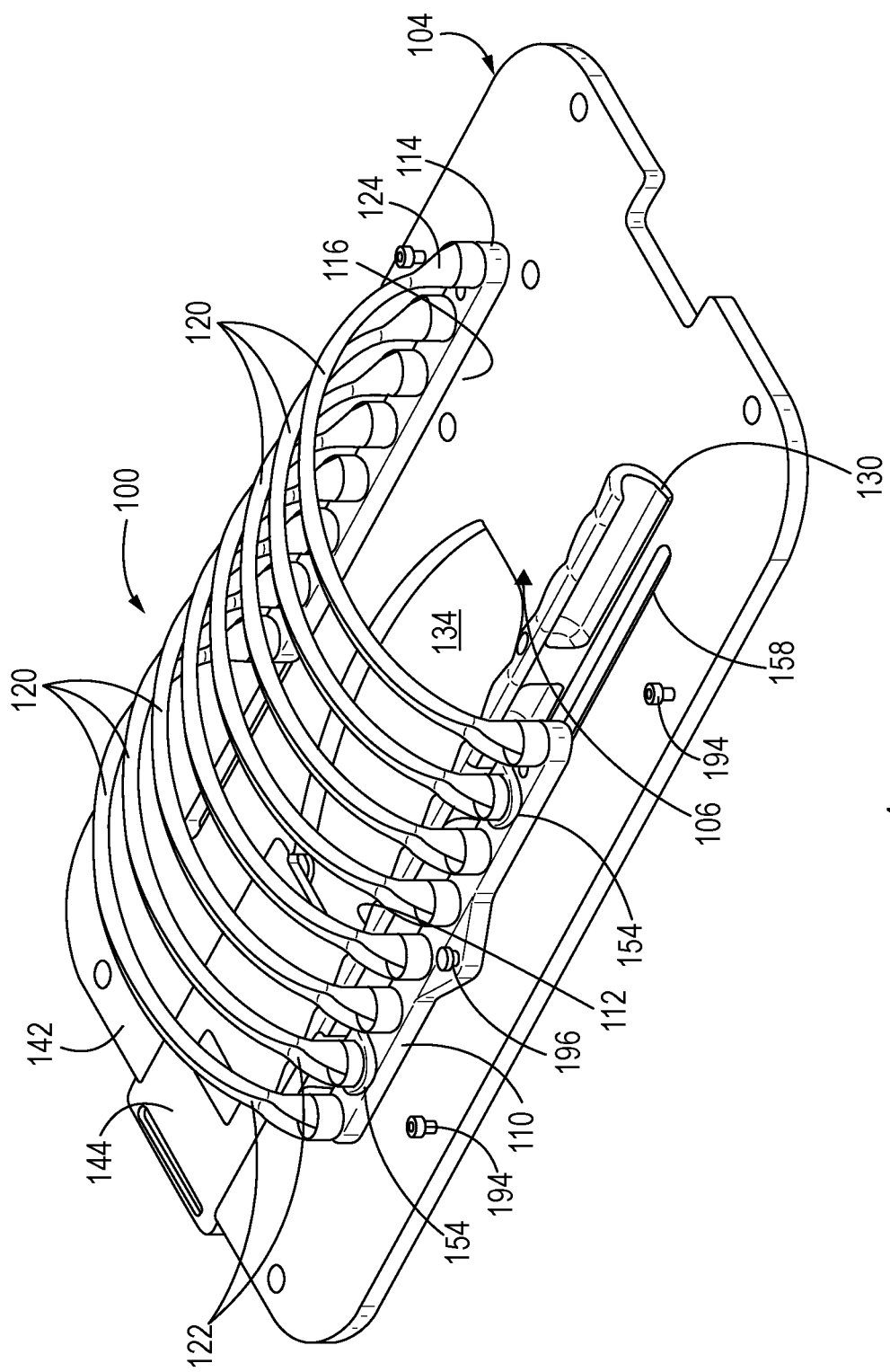
FIG. 1 is an isometric view of the surgical training device for use with a thoracic tissue model showing the base, simulated ribs, and spinal member according to an example embodiment of the disclosure.
Figure 2:
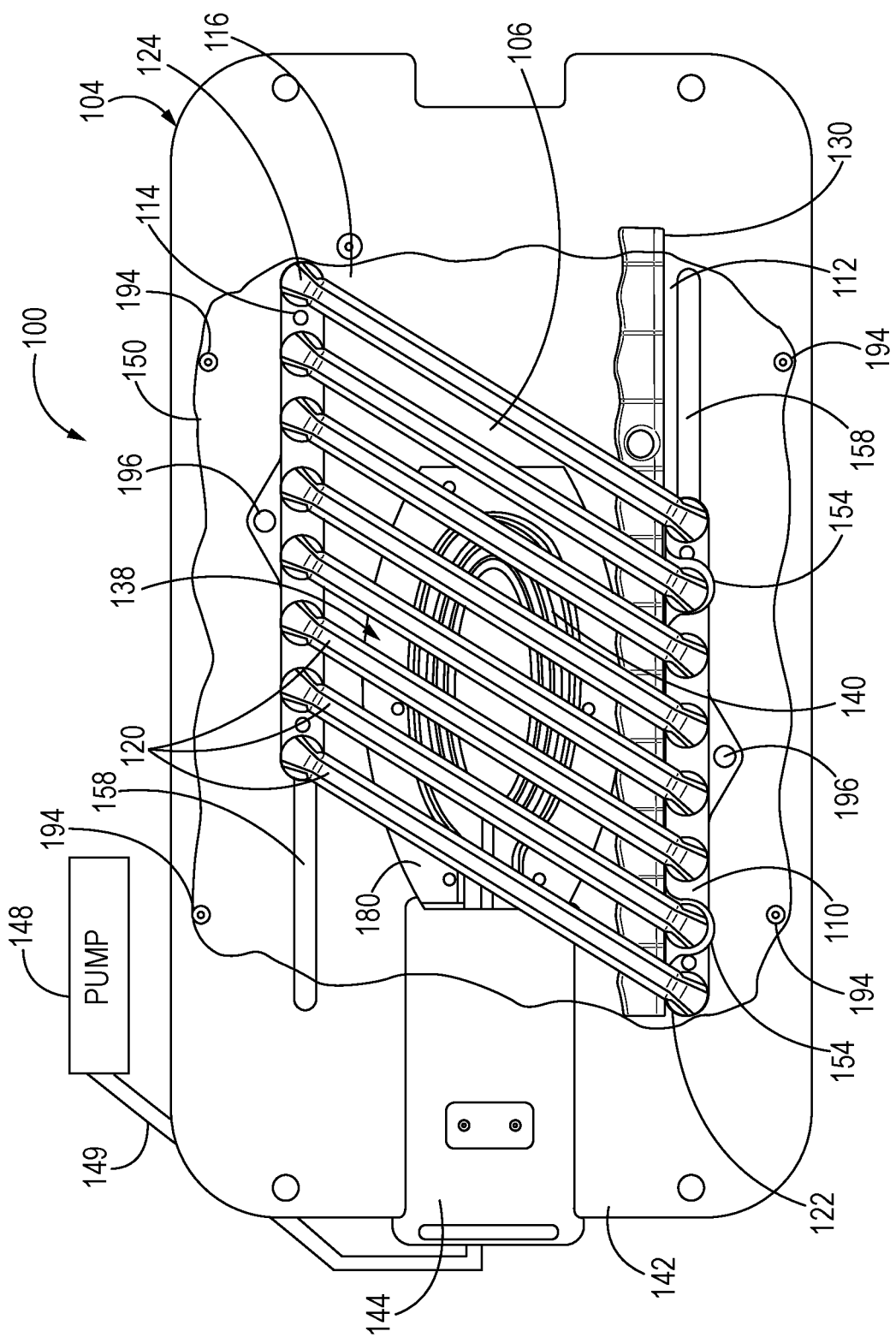
FIG. 2 is a top plan view of the surgical training device of FIG. 1 showing the tray carrying a thoracic tissue model under the simulated ribs and an outline of the simulated skin layer over the ribs.
Figure 3:
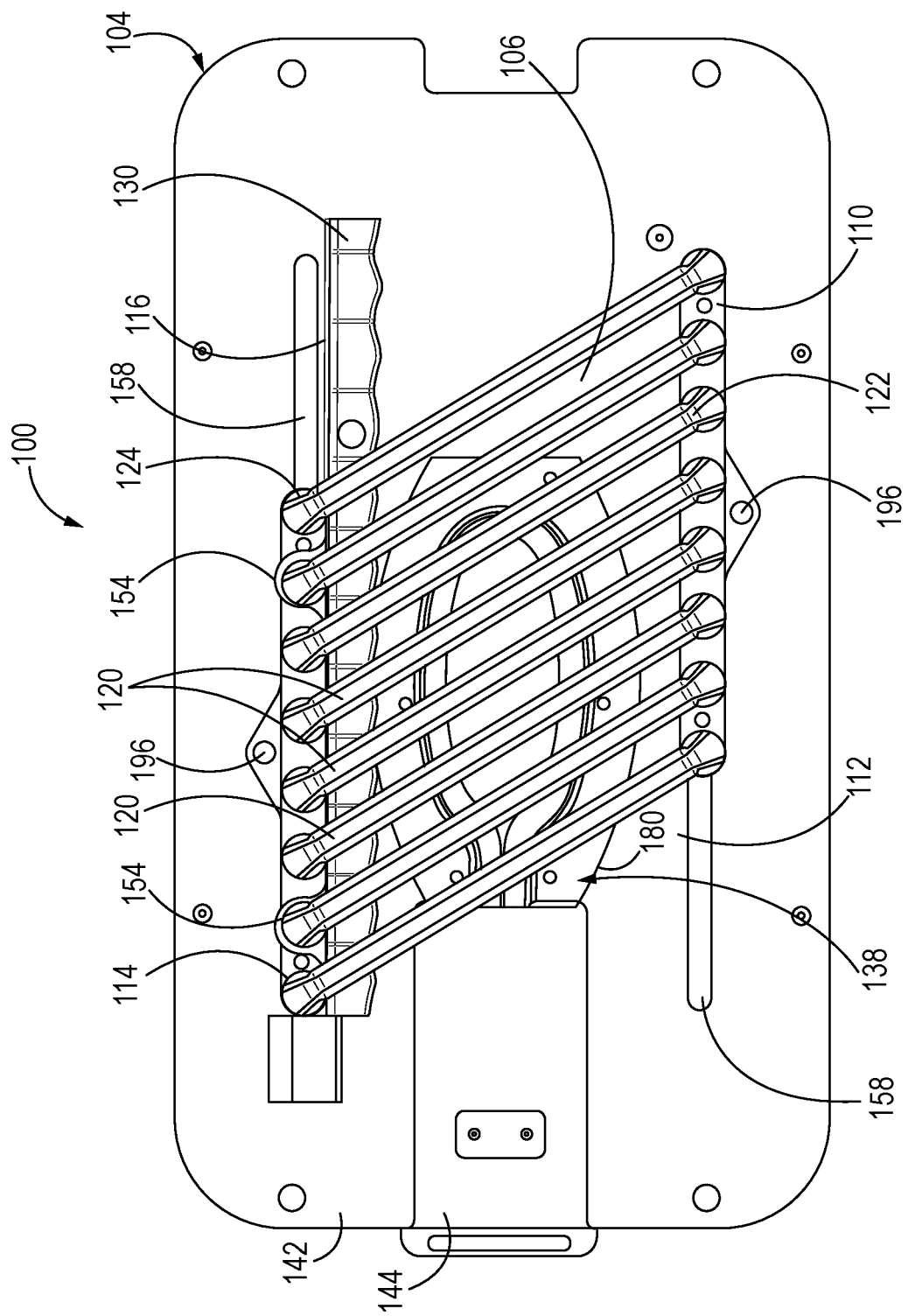
FIG. 3 is another top plan view of the surgical training device showing the tray without the thoracic tissue model and the simulated ribs repositioned from the right to the left thoracic configuration.

Referring now to FIG. 1, there is illustrated generally at 100 a surgical training device for use with a thoracic tissue model for surgical training. The surgical training device 100 includes a base 104 having a thoracic tissue model receiving area illustrated generally at 106. A first rib mounting member 110 is slidably coupled to the base 104 adjacent a first side 112 of the thoracic tissue model receiving area. A second rib mounting member 114 is slidably coupled to the base 104 adjacent a second side 116 of the thoracic tissue model receiving area opposite the first side 112. The surgical training device 100 includes a plurality of simulated ribs 120, each having a first end 122 coupled to the first rib mounting member 110 and a second end 124 coupled to the second rib mounting member 114 so that the plurality of simulated ribs are repositionable between right and left thoracic configurations as shown in the respective plan views of FIGS. 2 and 3. While the depictions in FIGS. 1-3 show eight simulated ribs 120, it should be appreciated that the surgical training device 100 in various embodiments may have a different number of simulated ribs 120, including, for example, one, two, three, four, five, six, seven, eight, nine, ten, eleven, or twelve ribs 120. In some embodiments, the surgical training device 100 may have one rib 120 or may have a plurality of ribs 120.

In this example, each of the first ends 122 of the simulated ribs 120 is rotatably coupled to the first rib mounting member 110. Each of the second ends 124 of the simulated ribs 120 is rotatably coupled to the second rib mounting member 114. A simulated spinal member 130 is movable between the first and second sides 112,116 of the thoracic tissue model receiving area 106, and optionally, is slidably mounted on the plurality of simulated ribs 120.

The base 104 has a tray receiving opening 134 therein that is configured to removably receive a tray 138 carrying the thoracic tissue model 140, which is shown schematically by the darkened portion in the tray in FIG. 2. The base 104 forms a body 142 as a flat plate member and an optional removable access panel 144 is coupled thereto. A fluid pump 148 (FIG. 2) may be configured to be optionally coupled by tubing 149 to the thoracic tissue model 140, which in an example includes harvested porcine tissue or a combination of harvested porcine tissue and simulated tissue made from a flexible polymer material that has characteristics similar to real tissue when manipulated by surgical instruments. Other types of animal tissue and synthetic substitutes may possibly be used. Each simulated rib 120 may be formed as a flexible polymer material so that it has flexibility and may bend when the ribs are repositioned between right and left thoracic configurations.

As also shown in FIG. 2, a simulated skin layer 150 may be formed over the plurality of simulated ribs 120 as depicted by the outline extending around the thoracic tissue model receiving area 106 and around the first and second rib mounting members 110,114 signifying the simulated skin layer. The base 104 in this example is formed as a thin, rectangular configured plate that forms the body 142 of the base. In an example, the base 104 may be formed from a rigid but strong plastic, light aluminum or other metal, or other rigid and lightweight material. The base 104 is configured in an example to fit on top of a larger universal platform support for robotic, laparoscopic, or manual surgical training.

The simulated ribs 120 create a single rib cage that can be moved into the correct anatomical position for left or right sided thoracic surgical training procedures, or a neutral configuration where the simulated ribs may be moved into a half-way position to simulate a supine chest. The simulated ribs 120 may be formed from a synthetic plastic material that is flexible enough to engage trocars and other surgical tools and bend slightly and allow intercostal port placement, but rigid enough to maintain the thoracic cavity configuration during surgical training.

Figure 5:
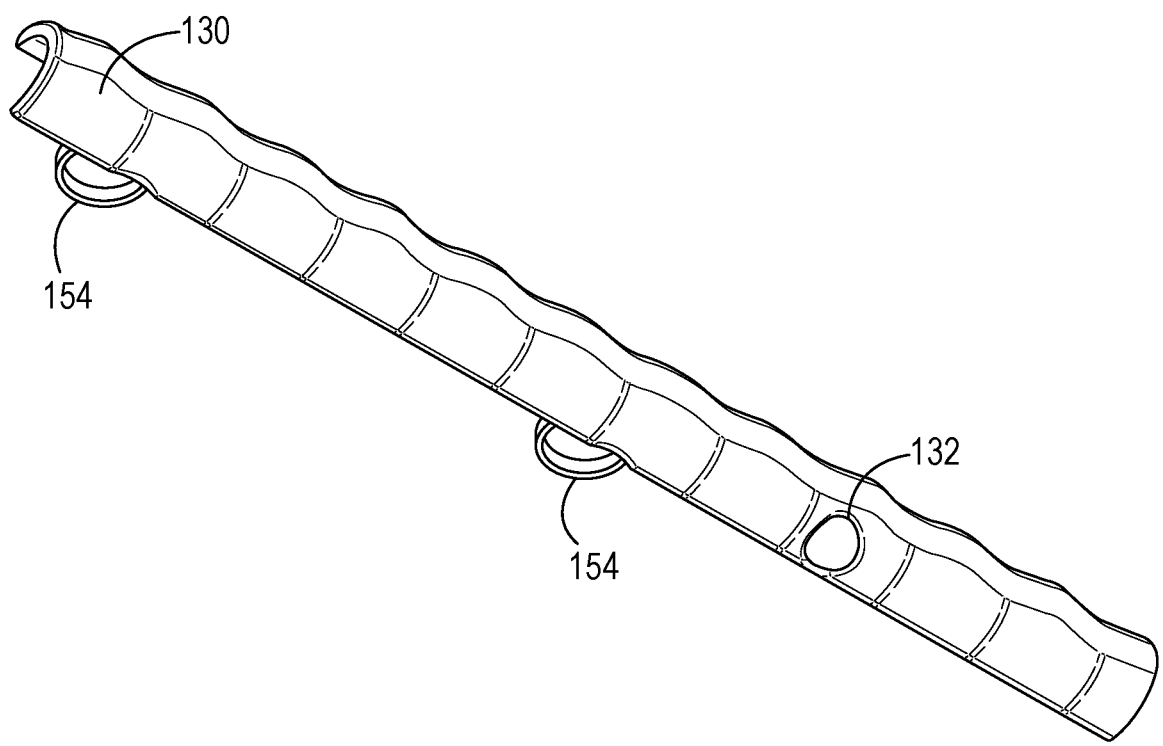
FIG. 5 is a side isometric view of the simulated spinal member shown in FIGS. 1-3.

The simulated spinal member 130 may have an arcuate, C-shaped configuration in cross-section as illustrated in FIGS. 1 and 5, and may also be formed from a plastic material. The simulated spinal member 130 is optionally slidably mounted on the plurality of simulated ribs 120 using two guide rings 154 that each fit over a simulated rib. The guide rings 154 allow the simulated spinal member 130 to move from a position adjacent the first rib mounting member 110 as shown in FIGS. 1 and 2, and slide over the two simulated ribs 120 onto which the guide rings 154 are received into a position adjacent the second rib mounting member 114 as shown in FIG. 3. Thus, the simulated spinal member 130 may be repositioned between the right and left thoracic configurations as best shown in the top plan view examples of FIGS. 2 and 3, where the simulated ribs 120 have been repositioned between the respective left and right thoracic configurations. In this example, the rib angles for the repositionable simulated ribs 120 may extend from a higher to a lower end corresponding to the human anatomy. When the angle of the simulated ribs 120 is adjusted, the simulated spinal member 130 is moved by passing the simulated spinal member over the simulated ribs 120 to the other thoracic configuration.

Figure 4:
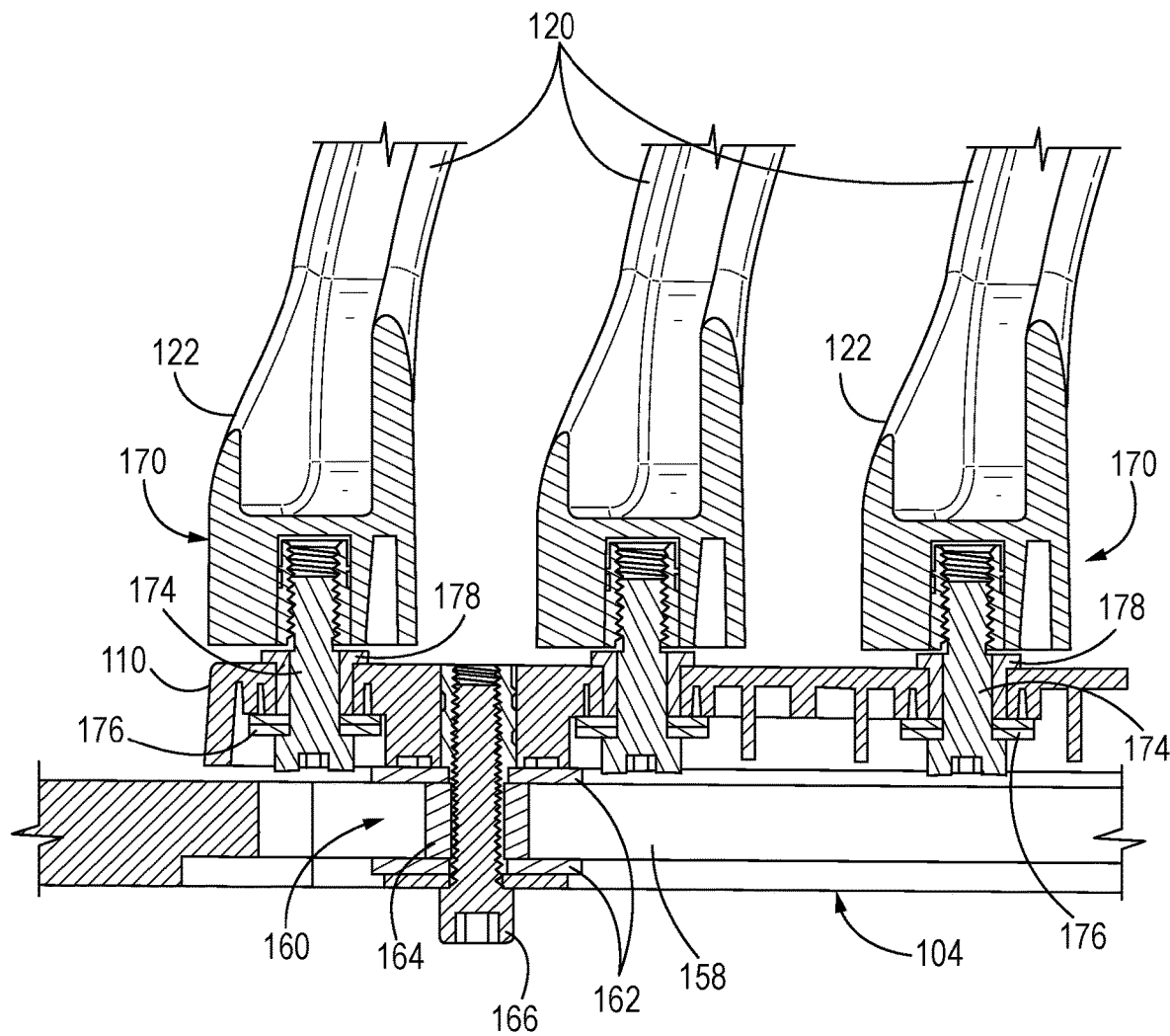
FIG. 4 is an enlarged sectional view of the ends of the simulated ribs and their rotatable coupling to a rib mounting member.

An enlarged sectional view of the first rib mounting member 110 is shown in FIG. 4 and is slidably coupled to the base 104 formed in this example as a plate. Although the description will proceed relative to the first rib mounting member 110, the second rib mounting member 114 and associated components are similarly constructed. A longitudinal groove 158 is formed within the base 104 at the respective first side 112 of the thoracic tissue model receiving area 106, and receives a slidable guide member 160 that includes mounting washers 162 and a mounting bushing 164 that are configured to slide along the groove 158. The mounting bushing 164 and mounting washers 162 receive a fastener 166, in this example, a mounting bolt, which engages the first rib mounting member 110 to which the fastener 166 is secured and secures the slidable guide member 160 to the first rib mounting member 110. The first rib mounting member 110 slides along the base 104 via the groove 158. The mounting bushing 164 and mounting washers 162 in an example may be formed of a flexible material that readily slides, such as a Teflon or other material that facilitates slidability of those components along the groove 158. Each of the first and second ends 122,124 of the simulated ribs 120 include a rotatable coupler 170 mounted thereon, which in the example of FIG. 4, is fastened to the respective first rib mounting member 110 via a rib mounting fastener 174 as an example mounting bolt that passes through the underside of the respective rib mounting member 110 and engages the lower end of the rotatable coupler 170.

Each rib mounting fastener 174 is passed through rib mounting washers 176 and a rib mounting bushing 178 received in an opening at the rib mounting member 110, which are formed and configured to allow the simulated ribs 120 to rotate via the rotatable coupler 170 relative to the respective rib mounting member 110. Both the rib mounting washers 176 and rib mounting bushing 178 for each simulated rib 120 may be formed of Teflon as non-limiting examples to permit free rotation of the simulated ribs 120 relative to the respective first or second rib mounting members 110,114 to which they are attached.

Figure 6:
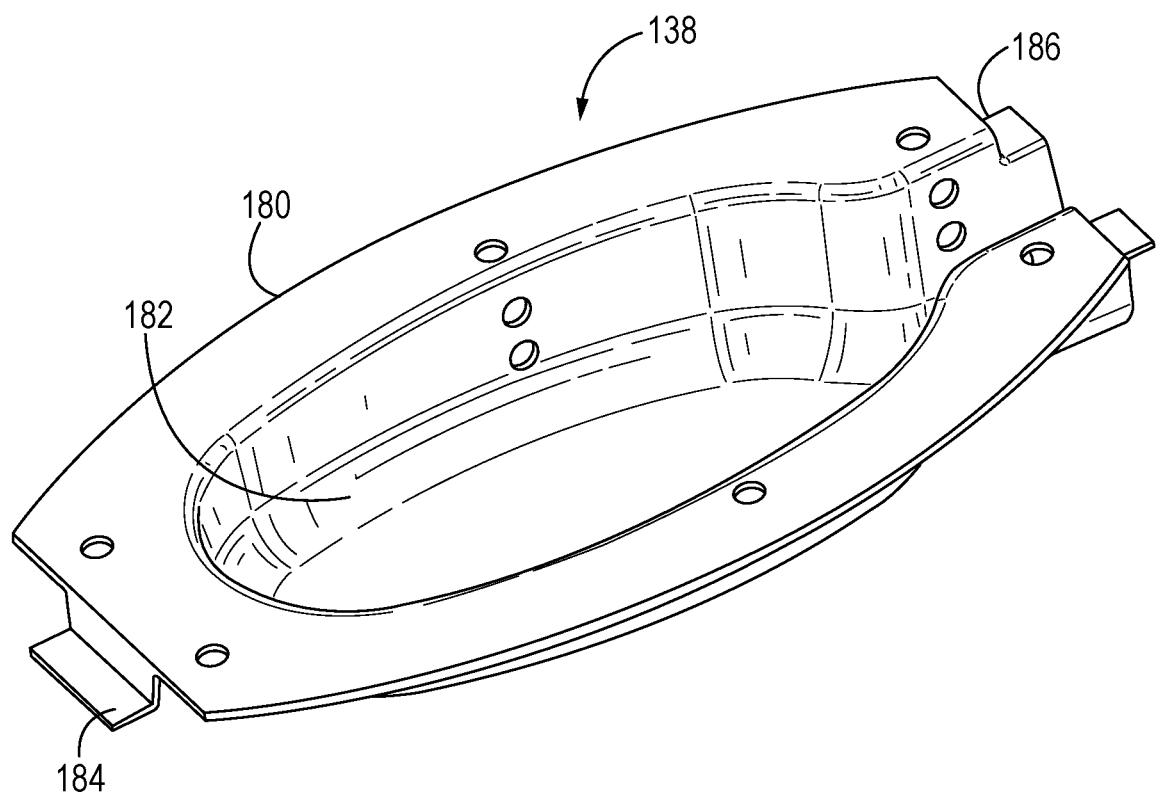
FIG. 6 is an isometric view of the tray in which a thoracic tissue model is received.

As best shown in the plan views of the surgical training device 100 in FIGS. 2 and 3 and the perspective view of the tray 138 in FIG. 6, the tray includes an outer, peripheral flange 180 that is received over the base 104 at the thoracic tissue model receiving area 106. An internal tray recess 182 (FIG. 6) is configured to fit within the substantially oval configured, tray receiving opening 134 (FIG. 1) on the base 104 at the thoracic tissue model receiving area 106. The front section of the tray 138 includes an L-shaped flange 184 that is configured to permit the lower section of that flange 184 to be received under the base 104 at the tray receiving opening 134. The rear or other end of the tray 138 includes a rear shoulder 186 onto which the removable access panel 144 rests as best shown in the schematic sectional view of the tray and access panel in FIG. 7.

Figure 7:
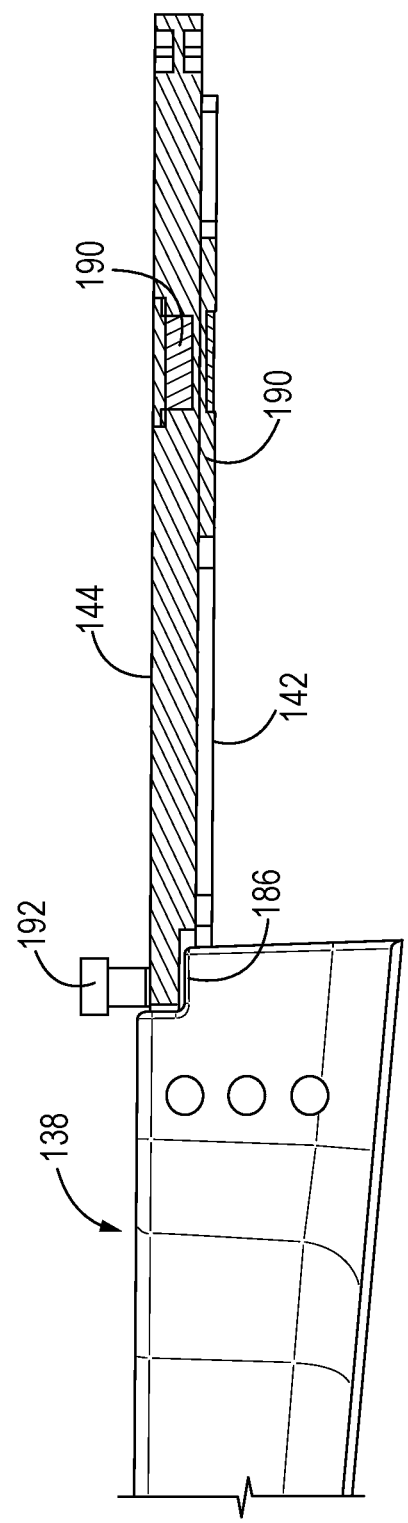
FIG. 7 is a sectional view of the removable access panel coupled to the body of the base shown in FIGS. 1-3.

The removable access panel 144 is coupled to the body 142 and optionally may have an upper or top face that is coplanar with an upper or top face of the base 104. The removable access panel 144 is slidable away from the base 104 to allow any pneumatic and hydraulic tubing 149 that extends from the thoracic tissue model 140 (FIG. 2) to be accessed for manipulation or connection to any fittings or other components of the thoracic tissue model. In an example, the thoracic tissue model 140 includes harvested porcine tissue or a combination of harvested porcine tissue and simulated tissue. Holding mechanisms 190, such as magnets, clips, latches, screws, a press fit, an interference fit, or the like (FIG. 7) may be used to retain the removable access panel 144 in a closed position and make it relatively easy for an operator to open the access panel. A lock nut 192 as shown in FIG. 7 may be used to lock the removable access panel 144 more securely to the tray 138, and when unlocked, the holding mechanisms 190 may provide a holding force that may be overcome readily when hoses and tubing 149 are to be connected to the thoracic tissue model 140.

As shown in FIG. 2, the fluid pump 148 is coupled via the hydraulic or pneumatic tubing 149 to the thoracic tissue model 140. The tubing 149 may extend under the removable access panel 144, which can be removed to gain access to the tubing and any other fittings that connect onto the thoracic tissue model. One or more tubes 149 may be used. In the illustrated example in FIG. 2, the simulated skin layer 150 extends over the plurality of simulated ribs 120, and may be connected at four hold down fasteners 194 positioned on the base 104 onto which the simulated skin layer 150 may be retained. The simulated skin layer 150 may be formed from a synthetic material, such as a silastic silicone elastomer material or similar material. In some embodiments, the simulated skin layer 150 is waterproof and easily cleaned. The first and second rib mounting members 110,114 may be locked in place via a thumbscrew 196 (FIGS. 1-3). Other locking mechanisms may be formed using other fastener mechanisms.

The tray 138 in the example of FIG. 6 may carry harvested porcine tissue and any other simulated tissue forming the thoracic tissue model 140. Different trays 138 may be configured to contain different types of harvested porcine tissue or other simulated tissue for different training purposes and to define different tissue areas within the thoracic cavity. The trays 138 and tissue contained therein may form a tissue cassette that may be inserted within the tray receiving opening 134, used for surgical training, and after training is completed, replaced by yet another new tray having new tissue.

Figure 8:
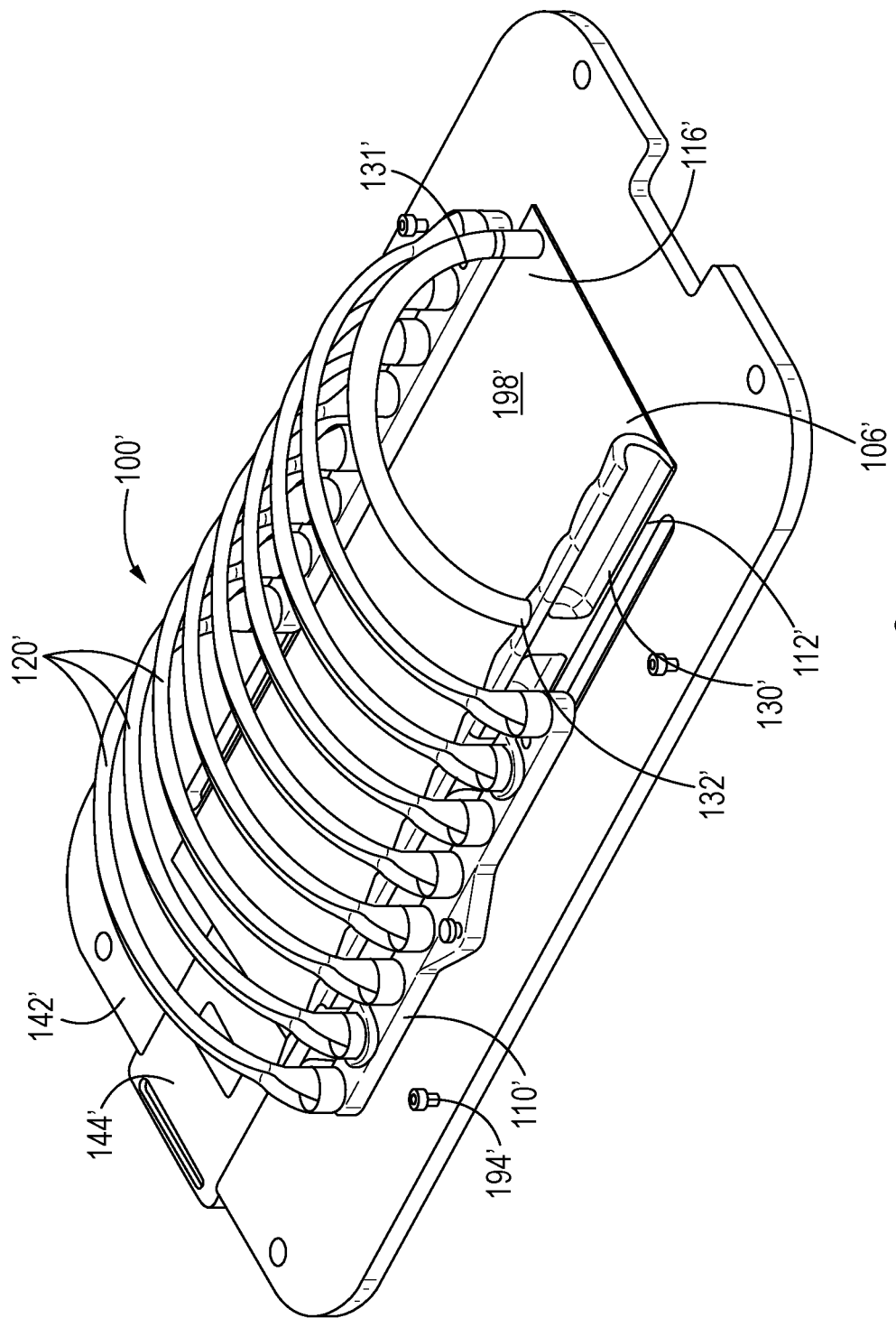
FIG. 8 is an isometric view of a second embodiment of the surgical training device where the base does not include a tray receiving opening.

A second embodiment of the surgical training device 100' is illustrated in FIG. 8 and is configured as an esophageal module that has a flat surface 198' at the general area defined as the thoracic tissue model receiving area 106'. There is no tray receiving opening, and instead, the flat surface 198' may receive an esophageal tissue model (or other tissue model) for thoracic tissue training and surgical training. In this example, a flexible guide tube 131' is connected between the first and second sides 112', 116' of the thoracic tissue model receiving area 106'. The simulated spinal member 130' includes an opening 132' through which the guide tube 131' is received. Most components of the surgical training device 100' in this second embodiment shown in FIG. 8 are similar in configuration to the components in the first embodiment of the surgical training device 100 and are given the prime notation. It should be appreciated that in various embodiments, the tray receiving opening of the surgical training device 100 may be incorporated in the surgical training device 100' depicted in FIG. 8, and/or the flexible guide tube 131' of the surgical training device 100' may be incorporated in the surgical training device 100 depicted in FIGS. 1-3.

Figure 9:
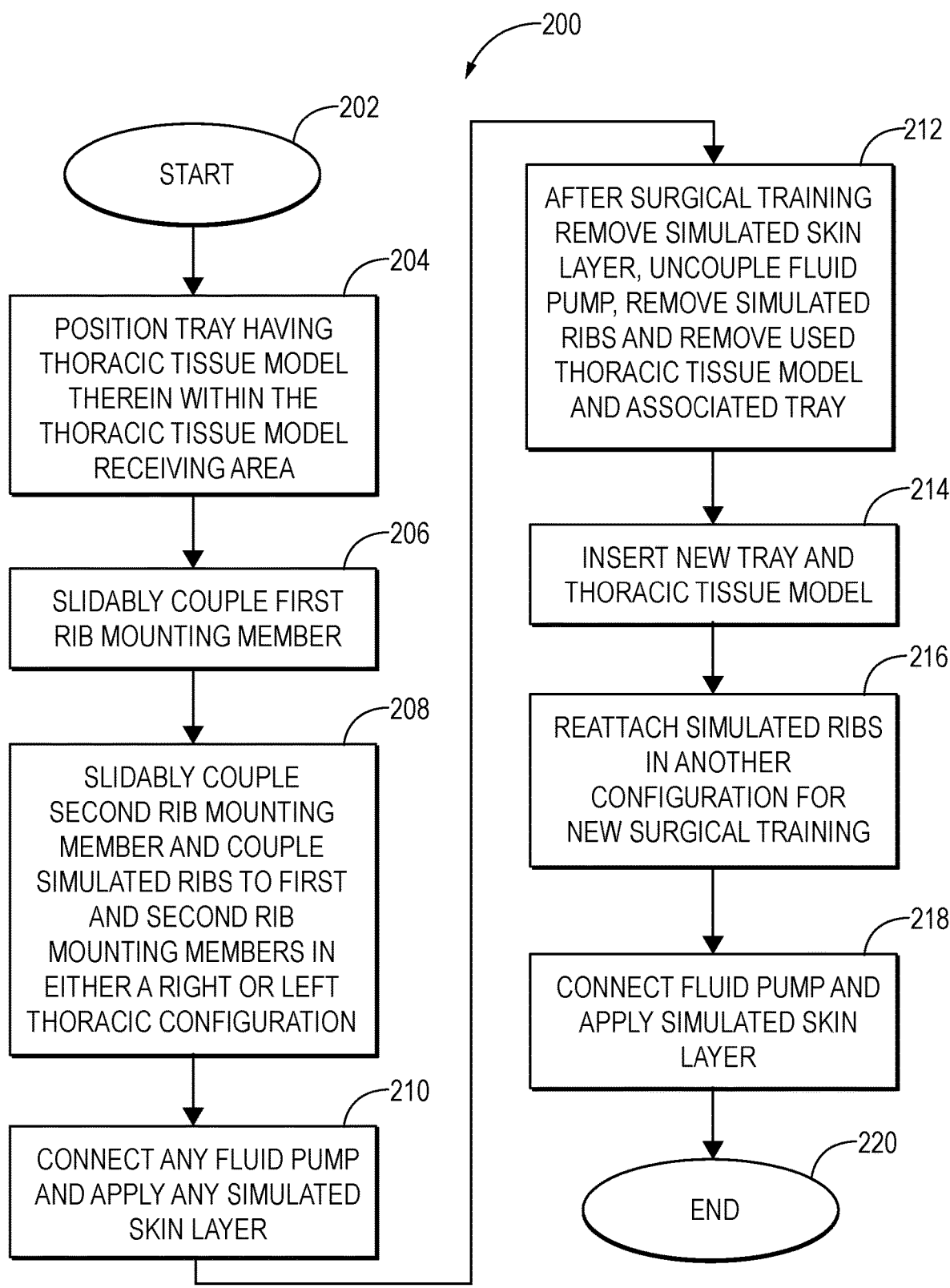
FIG. 9 is a high-level level flowchart illustrating a method of surgical training using the surgical training device of FIGS. 1-8.

Referring now to FIG. 9, there is illustrated at 200 a high-level flowchart of a method of preparing a surgical training device for use with a thoracic tissue model. The process starts (Block 202) and tray 138 having a thoracic tissue model 140 contained therein is positioned on the base 104 at the thoracic tissue model receiving area 106 (Block 204). A first rib mounting member 110 is slidably coupled to the base 104 adjacent the first side 112 of the thoracic tissue model receiving area 106 (Block 206). A second rib mounting member 114 is slidably coupled to the base 104 adjacent the second side 116 of the thoracic tissue model receiving area 106, and a plurality of simulated ribs 120 are coupled to the first and second rib mounting members 110,114 and positioned in either a right or left thoracic configuration (Block 208). The simulated spinal member 130 has been received over the simulated ribs 120 at this time. Any fluid pump 148 is connected and simulated skin layer 150 applied (Block 210). When surgical training is completed on that tray 138 and its thoracic tissue model 140, any simulated skin layer 150 is removed, the fluid pump 148 unconnected, the simulated ribs 120 removed, and used thoracic tissue model and associated tray discarded (Block 212). Some steps may be optional or performed in a different order. For example, the tray 138 may be positioned after the simulated ribs 120 are in place.

A new tray 138 and thoracic tissue model 140 are inserted within the thoracic tissue model receiving area 106 (Block 214). The simulated ribs 120 are reattached in another configuration for new surgical training (Block 216), which may be a right or left thoracic configuration, and any fluid pump 148 connected and simulated skin layer 150 applied (Block 218). In another example, the trays 138 may be swapped out while the simulated ribs 120 remain in place. The process ends (Block 220).

The real-tissue surgical training device 100 may be used, for example, with remotely operated, computer-assisted or teleoperated surgical systems, such as those described in, for example, U.S. Pat. No. 9,358,074 (filed May 31, 2013) to Schena et al., entitled "Multi-Port Surgical Robotic System Architecture," U.S. Pat. No. 9,295,524 (filed May 31, 2013) to Schena et al., entitled "Redundant Axis and Degree of Freedom for Hardware-Constrained Remote Center Robotic Manipulator," and U.S. Pat. No. 8,852,208 (filed Aug. 12, 2010) to Gomez et al., entitled "Surgical System Instrument Mounting," each of which is hereby incorporated by reference in its entirety.

Further, the real-tissue surgical training device 100 described herein may be used, for example, with a da Vinci® Surgical System, such as the da Vinci X® Surgical System or the da Vinci Xi® Surgical System, both with or without Single-Site® single orifice surgery technology, all commercialized by Intuitive Surgical, Inc., of Sunnyvale, California. Although various embodiments described herein are discussed in connection with a manipulating system of a teleoperated surgical system, the present disclosure is not limited to use with a teleoperated surgical system. Various embodiments described herein can optionally be used in conjunction with hand held instruments, such as laparoscopic tools for real-time surgical training with a harvested porcine tissue cassette.

Figure 10:
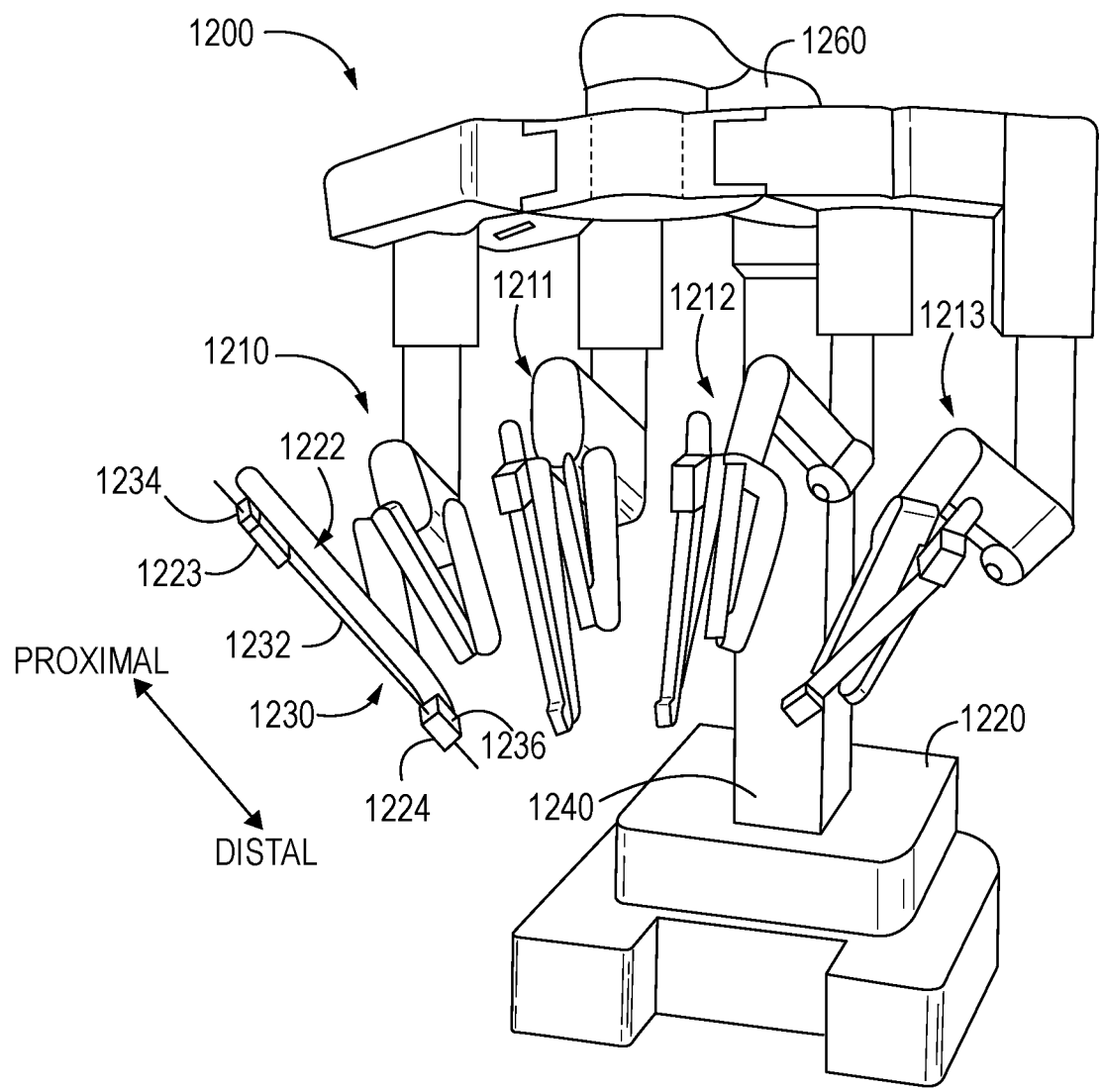
FIG. 10 is a perspective view of a manipulator system according to an example embodiment of the disclosure.

As discussed above, in accordance with various embodiments, surgical tools or instruments of the present disclosure are configured for use in teleoperated, computer-assisted surgical systems employing robotic technology (sometimes referred to as robotic surgical systems). Referring now to FIG. 10, an embodiment of a manipulator system 1200 of a computer-assisted surgical system, to which surgical instruments are configured to be mounted for use, is shown. Such a surgical system may further include a user control system, such as a surgeon console (not shown) for receiving input from a user to control instruments coupled to the manipulator system 1200, as well as an auxiliary system, such as auxiliary systems associated with the DA VINCI X® and DA VINCI XI®, Da Vinci SP.

As shown in the embodiment of FIG. 10, a manipulator system 1200 includes a base 1220, a main column 1240, and a main boom 1260 connected to main column 1240. Manipulator system 1200 also includes a plurality of manipulator arms 1210, 1211, 1212, 1213, which are each connected to main boom 1260. Manipulator arms 1210, 1211, 1212, 1213 each include an instrument mount portion 1222 to which an instrument 1230 may be mounted, which is illustrated as being attached to manipulator arm 1210.

Instrument mount portion 1222 may include a drive assembly 1223 and a cannula mount 1224, with a transmission mechanism 1234 of the instrument 1230 connecting with the drive assembly 1223, according to an embodiment. Cannula mount 1224 is configured to hold a cannula 1236 through which a shaft 1232 of instrument 1230 may extend to a surgery site during a surgical procedure. Drive assembly 1223 contains a variety of drive and other mechanisms that are controlled to respond to input commands at the surgeon console and transmit forces to the transmission mechanism 1234 to actuate the instrument 1230. Although the embodiment of FIG. 11 shows an instrument 1230 attached to only manipulator arm 1210 for ease of viewing, an instrument may be attached to any and each of manipulator arms 1210, 1211, 1212, 1213.

Other configurations of surgical systems, such as surgical systems configured for single-port surgery, are also contemplated. For example, with reference now to FIG. 11, a portion of an embodiment of a manipulator arm 2140 of a manipulator system with two surgical instruments 2300, 2310 in an installed position is shown. The surgical instruments 2300, 2310 can generally correspond to different instruments used for real-time tissue training using the harvested porcine tissue cassette. For example, the embodiments described herein may be used with a DA VINCI SP® Surgical System, commercialized by Intuitive Surgical, Inc. of Sunnyvale, California. The schematic illustration of FIG. 11 depicts only two surgical instruments for simplicity, but more than two surgical instruments may be mounted in an installed position at a manipulator system as those having ordinary skill in the art are familiar. Each surgical instrument 2300, 2310 includes a shaft 2320, 2330 having at a distal end a moveable end effector or an endoscope, camera, or other sensing device, and may or may not include a wrist mechanism (not shown) to control the movement of the distal end.

Figure 11:
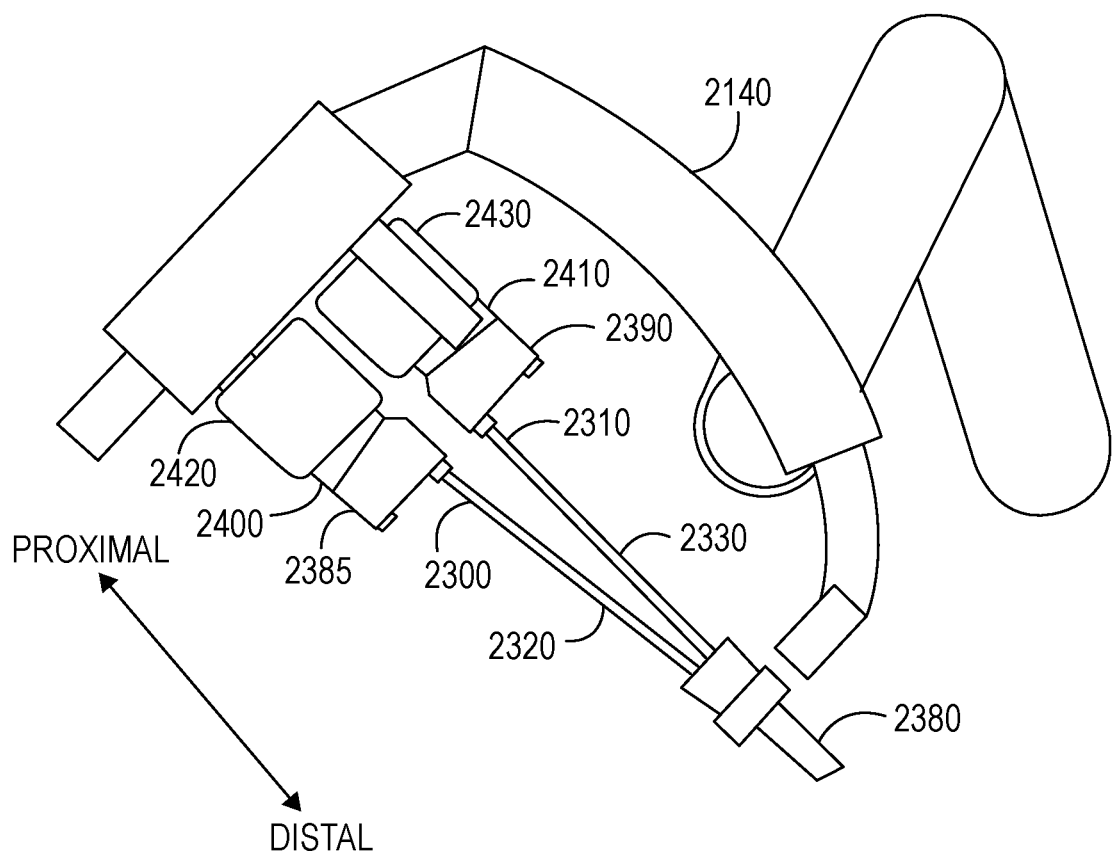
FIG. 11 is a partial schematic view of an embodiment of a manipulator system having a manipulator arm with two instruments in an installed position according to the present disclosure.

In the embodiment of FIG. 11, the distal end portions of the surgical instruments 2300, 2310 are received through a single port structure 2380 to be introduced into the harvested porcine tissue through the opening of the mouth and associated upper and lower jaws and into communication with the oropharynx region. As shown, the port structure includes a cannula and an instrument entry guide inserted into the cannula. Individual instruments are inserted into the entry guide to reach a surgical site corresponding to the oropharynx region of the porcine tissue that simulates the oropharynx region of the human body.

Other configurations of manipulator systems that can be used in conjunction with the present disclosure can use several individual manipulator arms. In addition, individual manipulator arms may include a single instrument or a plurality of instruments. Further, as discussed above, an instrument may be a surgical instrument with an end effector or may be a camera instrument or other sensing instrument utilized during a surgical procedure to provide information, (e.g., visualization, electrophysiological activity, pressure, fluid flow, and/or other sensed data) of a remote surgical site.

Transmission mechanisms 2385, 2390 are disposed at a proximal end of each shaft 2320, 2330 and connect through a sterile adaptor 2400, 2410 with drive assemblies 2420, 2430, which contain a variety of internal mechanisms (not shown) that are controlled by a controller (e.g., at a control cart of a surgical system) to respond to input commands at a surgeon side console of a surgical system to transmit forces to the force transmission mechanisms 2385, 2390 to actuate surgical instruments 2300, 2310.

The embodiments described herein are not limited to the embodiments of FIGS. 10 and 11, and various other teleoperated, computer-assisted surgical system configurations may be used with the embodiments described herein. The diameter or diameters of an instrument shaft and end effector are generally selected according to the size of the cannula with which the instrument will be used and depending on the surgical procedures being performed.

This description and the accompanying drawings that illustrate various embodiments should not be taken as limiting. Various mechanical, compositional, structural, electrical, and operational changes may be made without departing from the scope of this description and the invention as claimed, including equivalents. In some instances, well-known structures and techniques have not been shown or described in detail so as not to obscure the disclosure. Like numbers in two or more figures represent the same or similar elements. Furthermore, elements and their associated features that are described in detail with reference to one embodiment may, whenever practical, be included in other embodiments in which they are not specifically shown or described. For example, if an element is described in detail with reference to one embodiment and is not described with reference to another embodiment, the element may nevertheless be claimed as included in the other embodiment.

For the purposes of this specification and appended claims, unless otherwise indicated, all numbers expressing quantities, percentages, or proportions, and other numerical values used in the specification and claims, are to be understood as being modified in all instances by the term "about," to the extent they are not already so modified. Accordingly, unless indicated to the contrary, the numerical parameters set forth in the following specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

Further, this description's terminology is not intended to limit the invention. For example, spatially relative terms—such as "beneath", "below", "lower", "above", "upper", "proximal", "distal", and the like—may be used to describe one element's or feature's relationship to another element or feature as illustrated in the figures. These spatially relative terms are intended to encompass different positions (i.e., locations) and orientations (i.e., rotational placements) of a device in use or operation in addition to the position and orientation shown in the figures. For example, if a device in the figures is turned over, elements described as "below" or "beneath" other elements or features would then be "above" or "over" the other elements or features. Thus, the example term "below" can encompass both positions and orientations of above and below. A device may be otherwise oriented (rotated 90 degrees or at other orientations) and the spatially relative descriptors used herein interpreted accordingly.

Further modifications and alternative embodiments will be apparent to those of ordinary skill in the art in view of the disclosure herein. For example, the devices and methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various embodiments shown and described herein are to be taken as examples. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the spirit and scope of the present teachings and following claims.

It is to be understood that the particular examples and embodiments set forth herein are non-limiting, and modifications to structure, dimensions, materials, and methodologies may be made without departing from the scope of the present teachings.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A surgical training device for use with a thoracic tissue model, the surgical training device comprising:
    a base having a thoracic tissue model receiving area thereon;
    a first rib mounting member slidably coupled to the base adjacent a first side of the thoracic tissue model receiving area;
    a second rib mounting member slidably coupled to the base adjacent a second side of the thoracic tissue model receiving area opposite the first side; and
    a plurality of simulated ribs, each having a first end coupled to the first rib mounting member and a second end coupled to the second rib mounting member, wherein the plurality of simulated ribs are repositionable between right and left thoracic configurations.

2. The surgical training device of claim 1, wherein each of the first ends of the simulated ribs is rotatably coupled to the first rib mounting member; and wherein each of the second ends of the simulated ribs is rotatably coupled to the second mounting member.

3. The surgical training device of claim 1, further comprising a simulated spinal member movable between the first and second sides of the thoracic tissue model receiving area.

4. The surgical training device of claim 3, wherein the simulated spinal member is slidably mounted on the plurality of simulated ribs.

5. The surgical training device of claim 1, further comprising a simulated skin layer over the plurality of simulated ribs.

6. The surgical training device of claim 1, wherein the base has a tray receiving opening therein configured to removably receive a tray carrying the thoracic tissue model.

7. The surgical training device of claim 1, wherein the base comprises a body, and a removable access panel coupled thereto.

8. The surgical training device of claim 1, further comprising a fluid pump configured to be coupled to the thoracic tissue model.

9. The surgical training device of claim 1, wherein the thoracic tissue model comprises harvested porcine tissue.

10. The surgical training device of claim 1, wherein each simulated rib comprises a flexible polymer material.

11. A surgical training device for use with a thoracic tissue model, the surgical training device comprising:
- a base having a thoracic tissue model receiving area thereon;
- a first rib mounting member slidably coupled to the base adjacent a first side of the thoracic tissue model receiving area;
- a second rib mounting member slidably coupled to the base adjacent a second side of the thoracic tissue model receiving area opposite the first side;
- a plurality of simulated ribs, each having a first end rotatably coupled to the first rib mounting member and a second end rotatably coupled to the second rib mounting member, wherein the plurality of simulated ribs are repositionable between right and left thoracic configurations; and
- a simulated spinal member movable between the first and second sides of the thoracic tissue model receiving area.

12. The surgical training device of claim 11, wherein the simulated spinal member is slidably mounted on the plurality of simulated ribs.

13. The surgical training device of claim 11, further comprising a simulated skin layer over the plurality of simulated ribs.

14. The surgical training device of claim 11, wherein the base has a tray receiving opening therein configured to removably receive a tray carrying the thoracic tissue model.

15. The surgical training device of claim 11, wherein the base comprises a body, and a removable access panel coupled thereto.

16. The surgical training device of claim 11, further comprising a fluid pump configured to be coupled to the thoracic tissue model.

17. The surgical training device of claim 11, wherein the thoracic tissue model comprises harvested porcine tissue.

18. The surgical training device of claim 11, wherein each simulated rib comprises a flexible polymer material.

19. A method of preparing a surgical training device comprising:
- positioning a thoracic tissue model on a base having a thoracic tissue model receiving area thereon; and
- slidably positioning at least one of a first rib mounting member coupled to the base adjacent a first side of the thoracic tissue model receiving area and a second rib mounting member coupled to the base adjacent a second side of the thoracic tissue model receiving area opposite the first side, wherein a plurality of simulated ribs coupled to the first and second rib mounting members are positioned to a right or left thoracic configuration.

20. The method of claim 19, wherein each of the first ends of the simulated ribs is rotatably coupled to the first rib mounting member; and wherein each of the second ends of the simulated ribs is rotatably coupled to the second mounting member.

21. The method of claim 19, further comprising moving a simulated spinal member to one of the first and second sides of the thoracic tissue model receiving area.

22. The method of claim 19, further comprising a simulated skin layer over the plurality of simulated ribs.

23. The method of claim 19, further comprising operating a fluid pump coupled to the thoracic tissue model.

24. The method of claim 19, wherein the thoracic tissue model comprises harvested porcine tissue.

25. The method of claim 19, wherein each simulated rib comprises a flexible polymer material.

* * * * *